Jan. 16, 1934. L. E. LA BRIE 1,943,830
BRAKE
Filed April 2, 1928 2 Sheets-Sheet 1
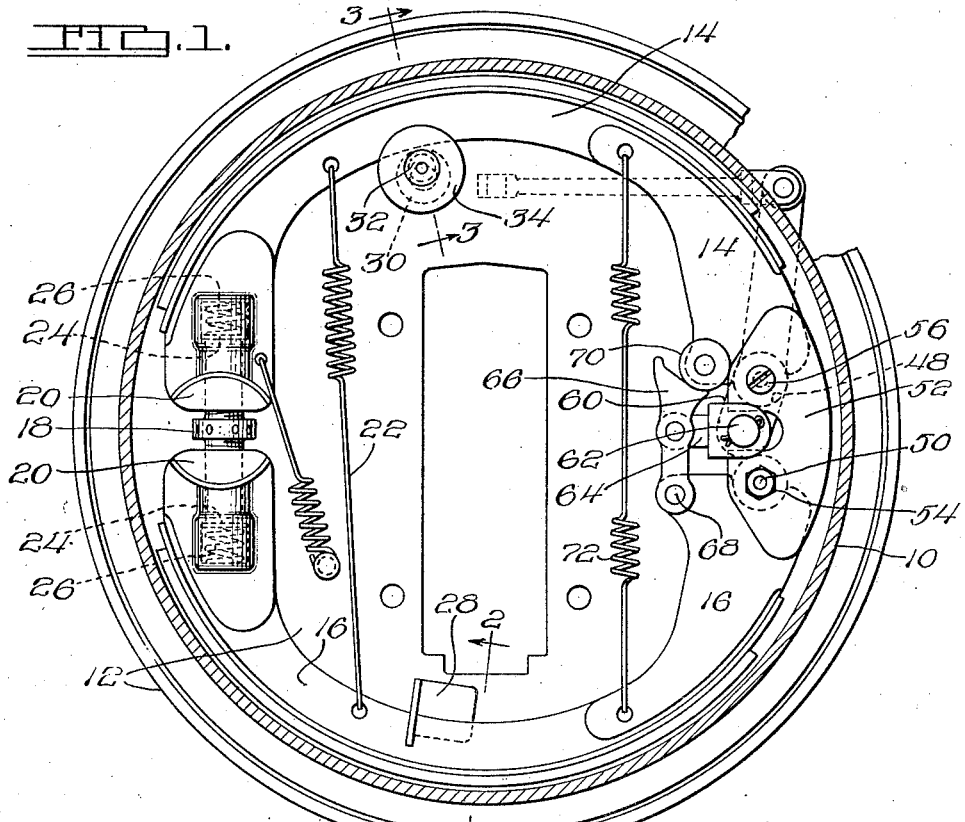
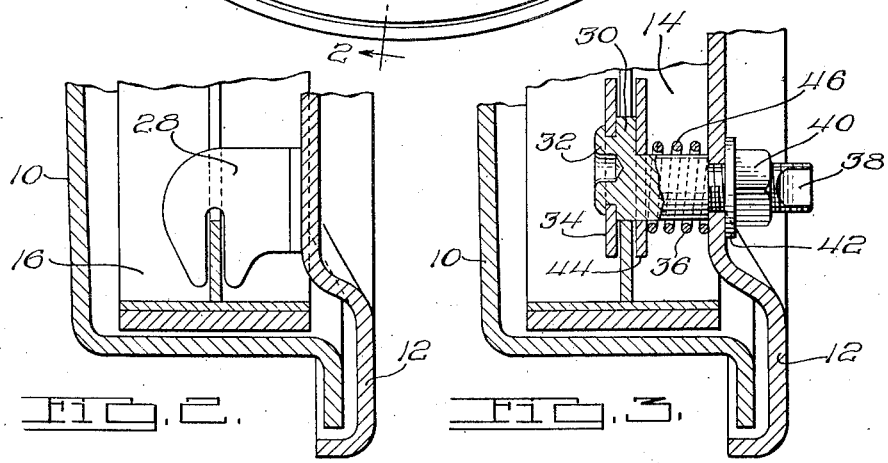
INVENTOR
Ludger E. LaBrie
BY
ATTORNEY

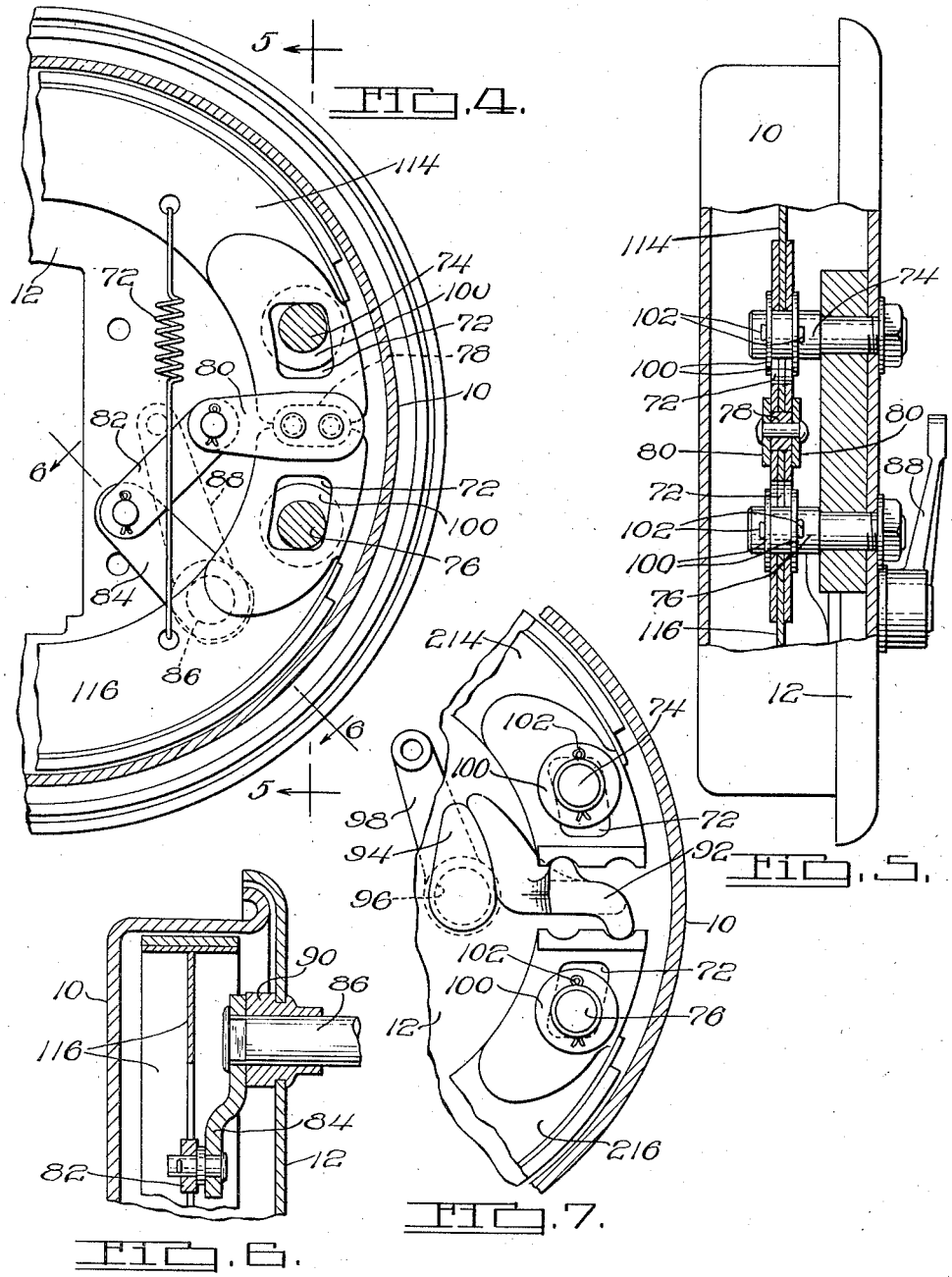

Patented Jan. 16, 1934

1,943,830

UNITED STATES PATENT OFFICE 1,943,830

BRAKE

Ludger E. La Brie, South Bend, Ind., assignor to Bendix Brake Company, South Bend, Ind., a corporation of Illinois Application April 2, 1928. Serial No. 266,505

13 Claims. (Cl. 188—78)

This invention relates to brakes, and is illustrated as embodied in an internal expanding automobile brake. An object of the invention is to provide a simple lever mechanism for applying the brake, preferably of a sort capable of use with a brake having different anchorages in opposite directions of drum rotation, and which is operative to predetermine the anchorage before fully applying the brake.

In one desirable arrangement, the lever is moved bodily to lift the shoe ends against the drum, so that one or the other of the ends is held anchored by the drum friction, after which the lever is rocked angularly to complete the application of the brake. Various types of levers, each embodying in itself substantial novelty, are shown in the drawings.

Other objects and features of the invention, including a novel guide and steady rest, and other new and desirable details of construction, will be apparent from the following description of the illustrative embodiments shown in the accompanying drawings, in which:

Figure 1 is a vertical section through the brake, just inside the head of the brake drum, and showing the brake shoes in side elevation;

Figure 2 is a partial section on the line 2—2 of Figure 1, showing a novel guide for one of the shoes;

Figure 3 is a partial section on the line 3—3 of Figure 1, showing an improved steady rest;

Figure 4 is a section corresponding to part of Figure 1, but showing a different modification of the lever mechanism;

Figure 5 is an elevation of the brake of Figure 4, partly broken away on the line 5—5 of Figure 4;

Figure 6 is a partial section on the line 6—6 of Figure 4; and

Figure 7 is a view corresponding to Figure 4 but showing another modification of the lever mechanism.

The illustrated brakes include a rotatable drum 10, at the open side of which is a support such as a backing plate 12, and within which is the brake friction means. The friction means shown is of the floating type which anchors differently in different directions of drum rotation, so that it is fully effective in either direction of rotation, and may include interchangeable floating shoes 14 and 16 (Figures 1—3) connected by a floating adjustable joint. This joint is shown as including a right-and-left threaded adjusting member 18 threaded into semi-cylindrical thrust blocks 20 seated in corresponding sockets in the shoes, the entire joint being held together by a spring 22 tensioned between the shoes. The member 18 is held in adjusted position by interengagement of teeth on its ends with toothed non-rotatable washers 24 in sockets in the shoe ends into which the ends of member 18 project, and urged into engaging position by springs 26.

According to an important minor feature of the invention, novel and simple means is provided for positioning the shoes in released position. Shoe 16 has its web embraced by a notch in a guide or stamping 28 extending in a plane at right angles to the shoe web and having a base spot-welded or otherwise secured to the backing plate 12. Shoe 14 has the inner edge of its web engaged, when the brake is released, by an adjustable eccentric 30, having its end riveted over at 32 rigidly to hold a washer 34 engaging one side of the shoe web. Eccentric 30 has a stem 36 shouldered to engage the inner face of plate 12, and having a threaded smaller-diameter portion 38 projecting through the plate and provided with a clamping nut 40, and with a lock washer 42 if desired. A washer 44 sleeved on stem 36 is yieldingly held against the side of the shoe web opposite the washer 34 by a coil spring 46 sleeved on the stem 36 and compressed between washer 44 and plate 12.

When the drum is turning clockwise with the brake applied, shoe 14 anchors against a post 48 carried by plate 12 and engaged by the end of the shoe, while if the drum is turning counter-clockwise the shoe 16 anchors against a similar post 50. Posts 48 and 50 carry at their ends a plate or stamping 52 which connects and reinforces the posts in their action as anchors, and which also confines the ends of the shoes against lateral movement. The post 50 is shown with a reduced-diameter end on which a nut 54 is threaded to hold plate 52, while post 48 has a screw 56 threaded into its end and holding plate 52.

Post 50 is shown as fixedly mounted on plate 12, whereas post 48 is rotatably supported thereby, and serves as a brake-applying shaft, the screw 56 being journaled in plate 52 to permit such movement. Shaft 48 has at its end an eccentric part such as an arm 60 connected by a pivot 62 to floating means such as a link 64 connected to a pair of cam levers 66. Levers 66 are arranged on opposite sides of the web of shoe 16, and are connected to the shoe web by a pivot 68. At their upper ends they are formed with cam or wedge surfaces acting on rollers 70 mounted on opposite sides of the web of shoe 14.

Levers 66 act, in applying the brake, against the resistance of a return spring 72 tensioned between the shoes. This spring is strong enough so that at first the link 60 moves the shoe assembly bodily to the right, until the ends of the shoes engage drum 10 while still in anchored position. If the drum is turning clockwise, the drum friction co-operates with levers 66 in the completion of the application of the brake, to hold shoe 14 anchored while shoe 16 is forced to applied position and in turn to act through joint 18 to force shoe 14 to applied position. This occurs if the automobile is moving backward. If the drum is turning counter-clockwise, with the automobile moving forward, the shoe 16 is held anchored by the drum friction as the application of the brake is completed.

The arrangement of Figures 4—6 differs from that just described, in that the shoes 114 and 116 have slots 72 for anchor posts 74 and 76 carried by plate 12. The ends of the shoes are formed with recesses embracing a laminated cam 78 carried by and rigidly riveted between levers 80 connected by floating means such as a link 82 with an arm 84 fixed on an operating shaft 86. As before, the spring 72 is strong enough so that the shoe assembly is shifted bodily to the right before it is expanded, so that one or the other of the shoes remains anchored throughout the operation of applying the brake. An operating lever 88 is shown for the shaft 86, which shaft is journaled in a bracket 90 secured to plate 12.

In Figure 7, shoes 214 and 216 have anchors 74 and 76 as in Figure 4, and are formed at their ends with pairs of recesses adapted to receive projections on a floating operating lever 92. Lever 92 has a cam-shaped inner end operatively engaged by a cam or lever 94 on a shaft 96 journaled in a bracket carried by plate 12, and operated by an arm 98 outside the brake. The operation is the same as described for Figure 4.

Posts 74 and 76 are shown with washers 100 held by cotter pins 102 and confining the shoe ends laterally.

While several illustrative embodiments have been described in detail, it is not my intention to limit the scope of the invention to those particular embodiments, or otherwise than by the terms of the appended claims.

I claim:

1. A brake comprising, in combination, a drum, a shiftable-anchorage floating friction device having movable ends, a lever acting on said ends, means for first moving the lever to move at least one of said ends against the drum and for then rocking the lever angularly to force said ends in opposite directions to complete the application of the brake, and return spring means urging said ends toward each other and strong enough to hold both of said ends in anchored position during the first movement of the lever and then yielding to permit the spreading of said ends by the rocking of said lever.

2. A brake comprising, in combination, a drum, a shiftable-anchorage floating friction device having movable ends, a lever acting on said ends, means for first moving the lever bodily to move said ends against the drum and for then rocking the lever angularly to force said ends in opposite directions to complete the application of the brake, and return spring means urging said ends toward each other and strong enough to hold both of said ends in anchored position during the first movement of the lever and then yielding to permit the spreading of said ends by the rocking of said lever.

3. A brake comprising, in combination, a drum, a shiftable-anchorage floating friction device having movable ends, a lever acting on said ends, means for first moving the lever bodily to move said ends against the drum and for then rocking the lever angularly to force said ends in opposite directions to complete the application of the brake, said lever being mounted for floating movement with said ends, and return spring means urging said ends toward each other and strong enough to hold both of said ends in anchored position during the first movement of the lever and then yielding to permit the spreading of said ends by the rocking of said lever.

4. A brake comprising, in combination, a drum, a floating friction device having movable ends, a lever acting on said ends, means for first moving the lever bodily to move said ends against the drum and for then rocking the lever angularly to force said ends in opposite directions to complete the application of the brake, said ends being recessed for engagement with the lever, and return spring means urging said ends toward each other and strong enough to hold both of said ends in anchored position during the first movement of the lever and then yielding to permit the spreading of said ends by the rocking of said lever.

5. A brake comprising, in combination, a drum, a floating friction device having movable ends, a lever acting on said ends, and means for first moving the lever bodily to move said ends against the drum and for then rocking the lever angularly to force said ends in opposite directions to complete the application of the brake, said ends being recessed for engagement with the lever and said means including an operating arm disconnectedly engaging said lever.

6. A brake comprising, in combination, a shoe having a web, and a guide having a web extending at right angles to the shoe web, one of said webs being notched to embrace the other.

7. A brake comprising, in combination, a shoe having a web with an opening, a post projecting through the opening, washers sleeved on the post and engaging opposite sides of the web, and means carried by the post for holding said washers.

8. A brake comprising, in combination, a shoe having a web with an opening, a post projecting through the opening, washers sleeved on the post and engaging opposite sides of the web, and cotter pins extending through the post and holding said washers.

9. A brake comprising, in combination, a drum, a floating friction device having movable ends, a lever mounted on one of said ends and having both radial and circumferential components of thrust acting against the other of said ends, a return spring acting on said ends and which is strong enough to overcome the circumferential thrust of the lever until further radial movement is prevented by engagement of the friction device with the drum, and means for first moving the lever radially bodily to move said ends against the drum and for then rocking the lever angularly to force said ends in opposite directions to complete the application of the brake.

10. A brake comprising, in combination, a drum, a floating friction device having movable ends, a lever acting on said ends, a return spring acting on said ends, and means for first moving the lever bodily to move said ends against the drum and for then rocking the lever angularly to force said ends in opposite directions to complete the application of the brake, said spring being of a strength to prevent rocking of the lever until said ends engage the drum and then yielding to permit spreading said ends, said ends being recessed for engagement with the lever and said means including an operating arm linked to said lever.

11. A brake comprising, in combination, a drum, a floating friction device having movable ends, a lever acting on said ends, a return spring acting on said ends, and means for first moving the lever bodily to move said ends against the drum and for then rocking the lever angularly to force said ends in opposite directions to complete the application of the brake, said spring being of a strength to prevent rocking of the lever until said ends engage the drum and then yielding to permit spreading said ends, said lever being mounted on one of said ends, and said means including an arm linked to the lever.

12. A brake comprising, in combination, friction means having separable ends, a lever pivoted on one of said ends and having wedging engagement with the other of said ends, a shaft having an operating arm, and a floating link connecting said arm and said lever.

13. A brake comprising, in combination, friction means having separable ends, a lever pivoted on one of said ends and having wedging engagement with the other of said ends, a link connected to said lever, and a shaft having an eccentric part operating the link.

LUDGER E. LA BRIE.